Figure 13:
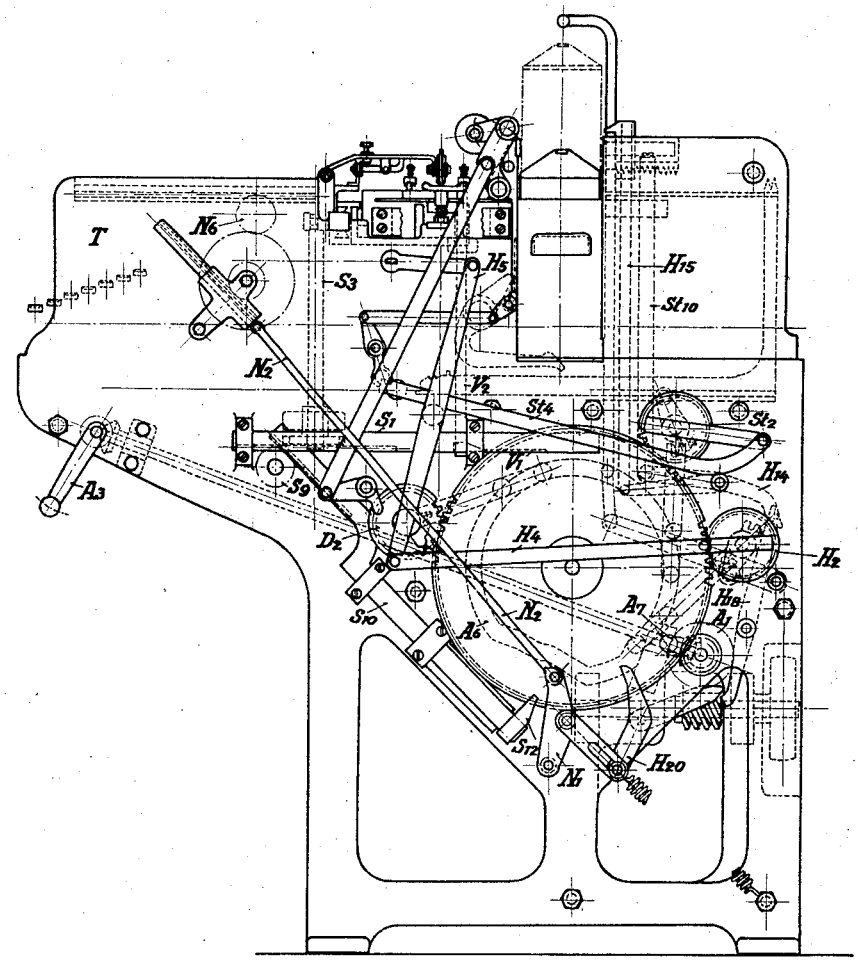

May 15, 1928.
A. A. EGLI
1,669,932
WRITING MACHINE
Filed March 29, 1923   13 Sheets-Sheet 1
Fig. 1ª
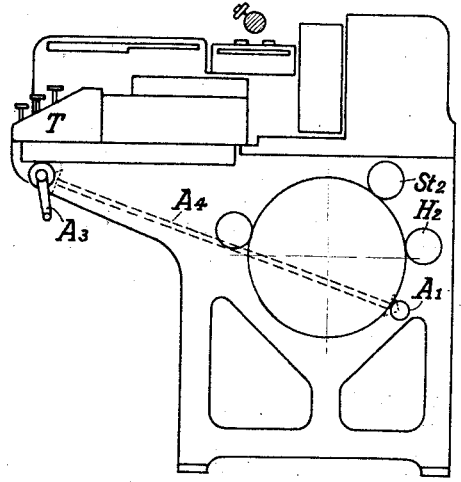
Fig. 1ᵇ
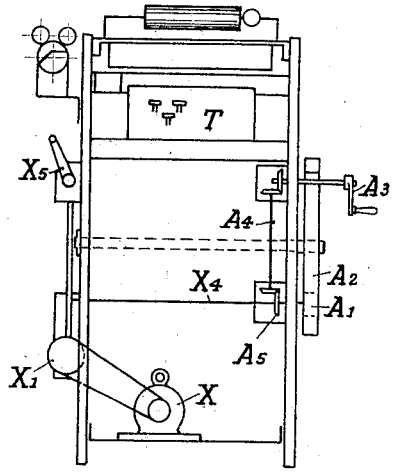
Fig. 1ᶜ
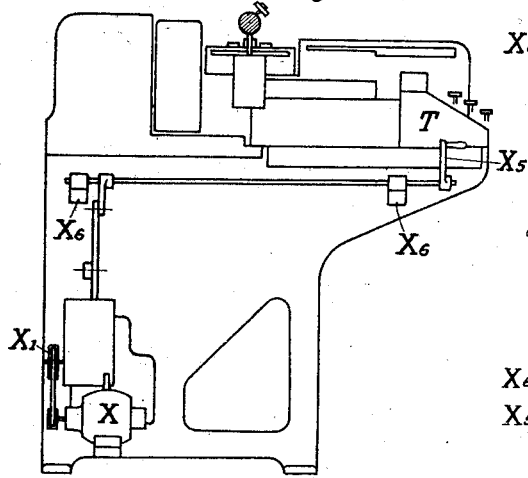
Fig. 1ᵈ
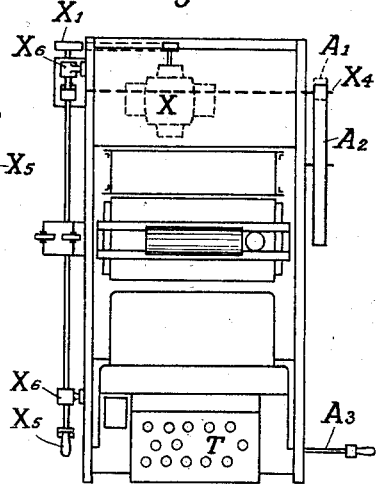
Inventor
Arnold August Egli
by Knight Bro
attorneys

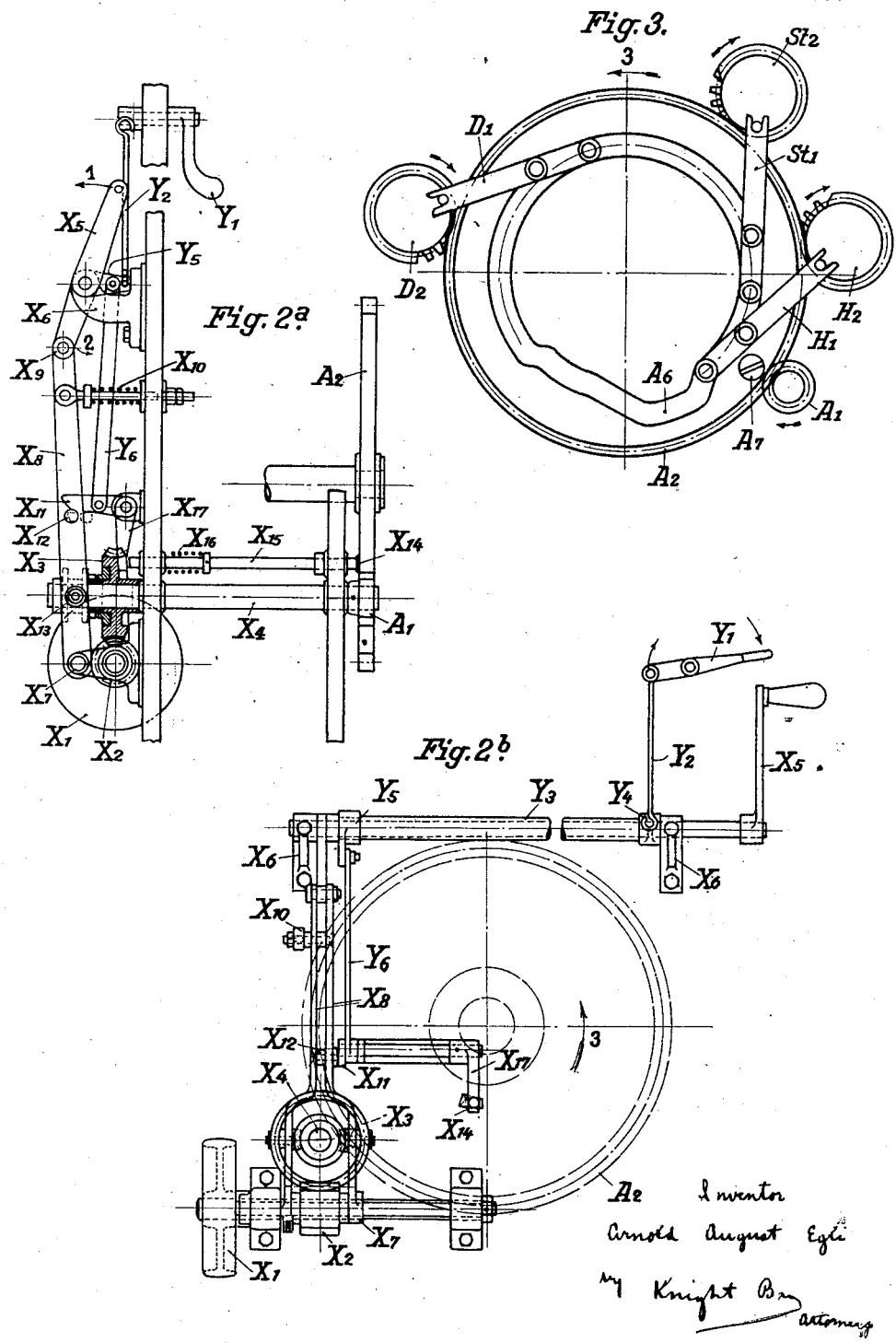

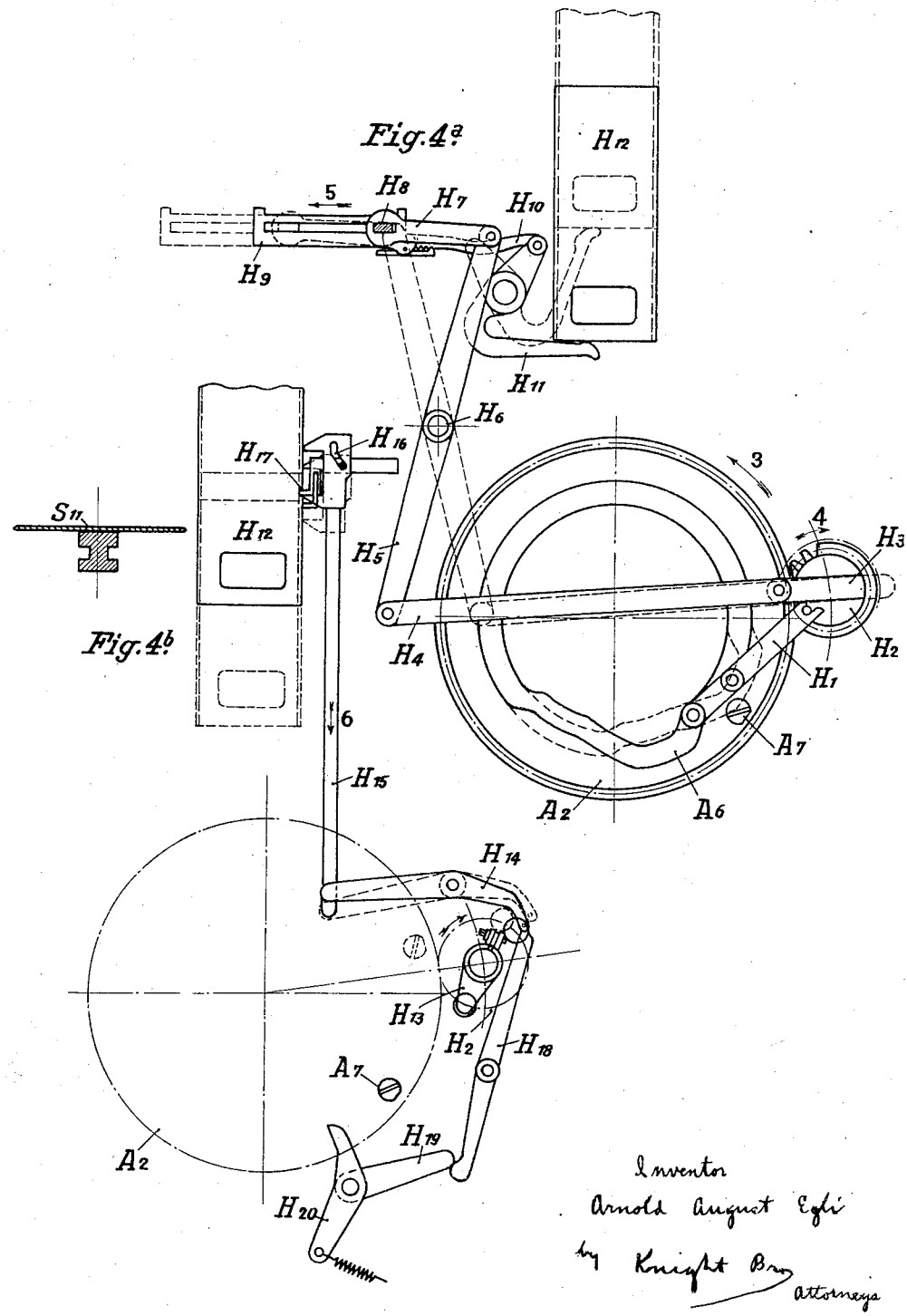

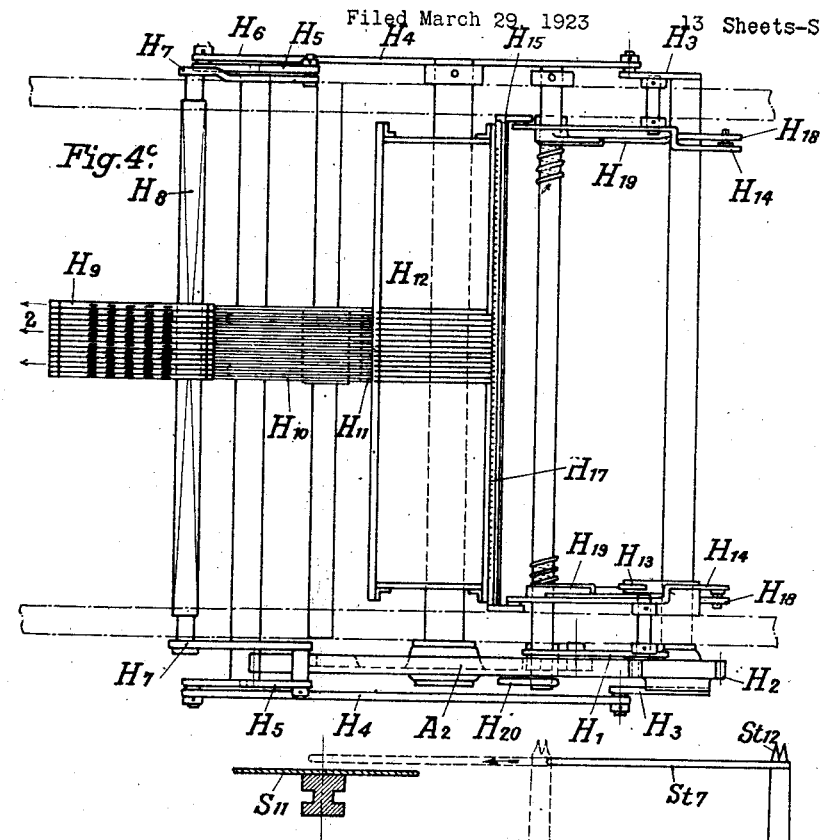
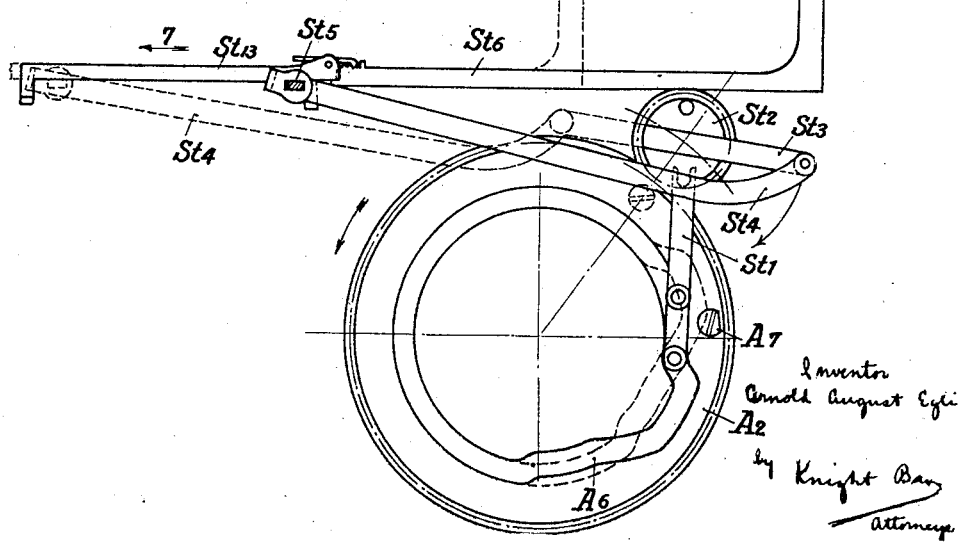

May 15, 1928. 1,669,932
A. A. EGLI
WRITING MACHINE
Filed March 29, 1923   13 Sheets-Sheet 5
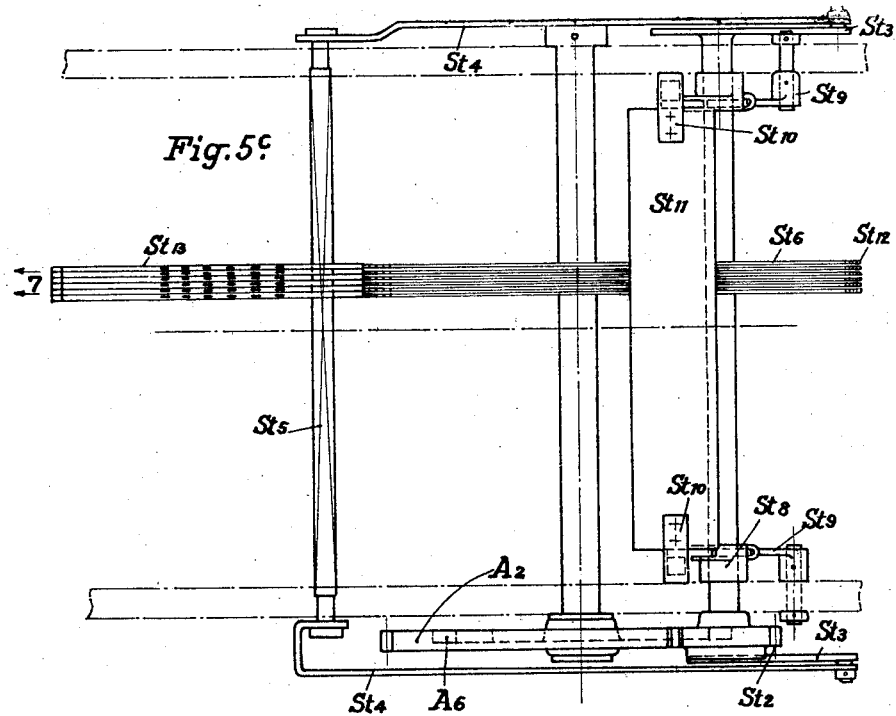
Fig. 5ᶜ
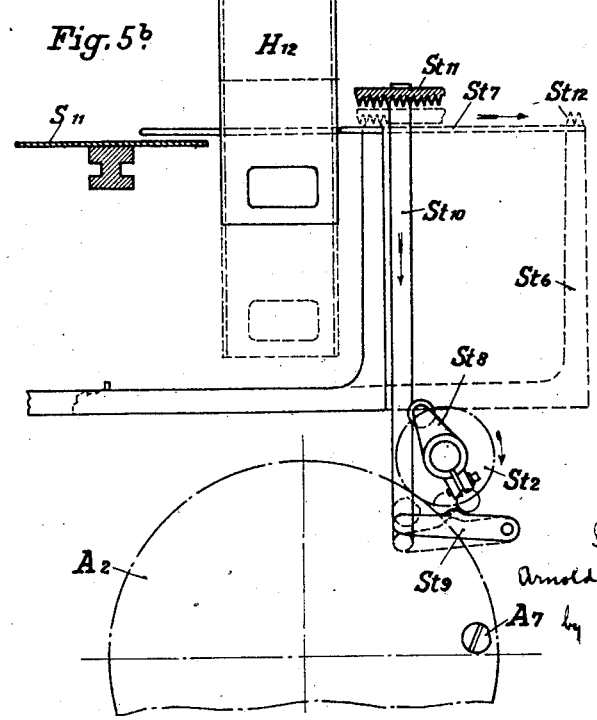
Fig. 5ᵇ
Inventor
Arnold August Egli
by Knight Bros
Attorneys May 15, 1928. 1,669,932
A. A. EGLI
WRITING MACHINE
Filed March 29, 1923 13 Sheets-Sheet 6
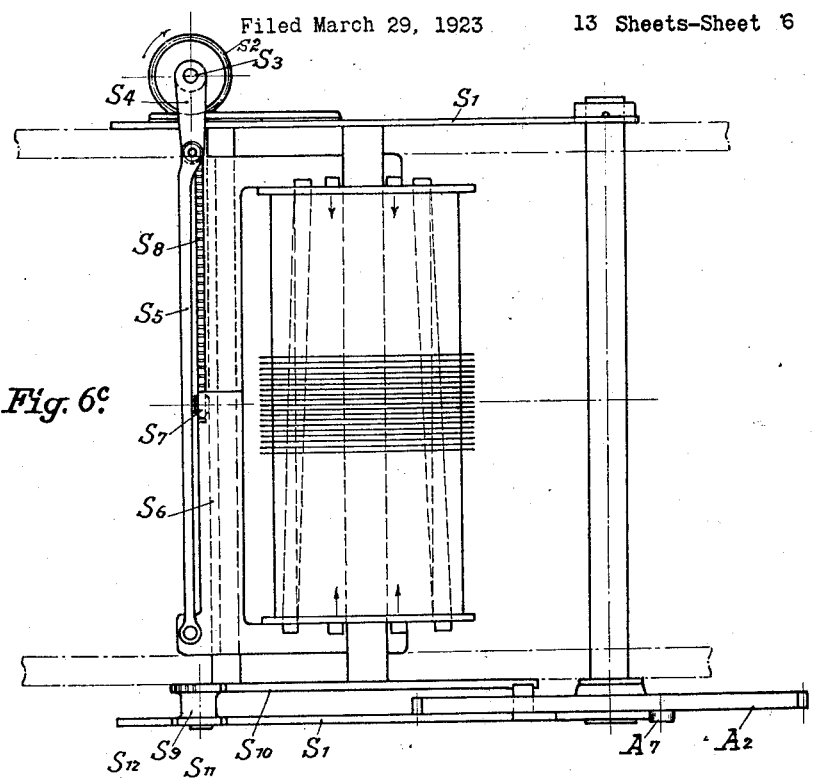
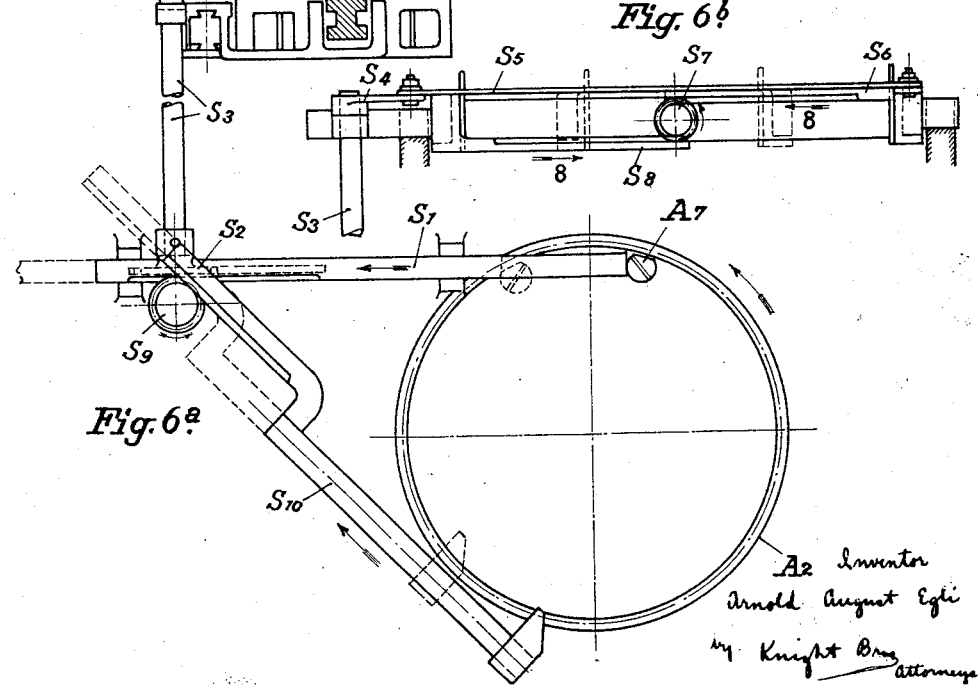

May 15, 1928. 1,669,932
A. A. EGLI
WRITING MACHINE
Filed March 29, 1923 13 Sheets-Sheet 7
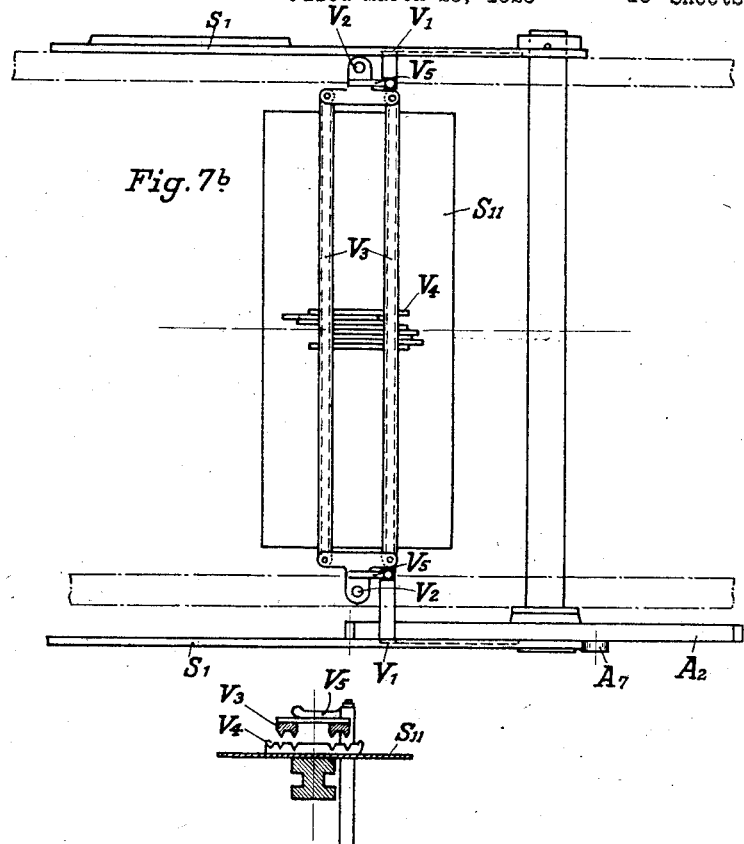
Fig. 7ᵇ
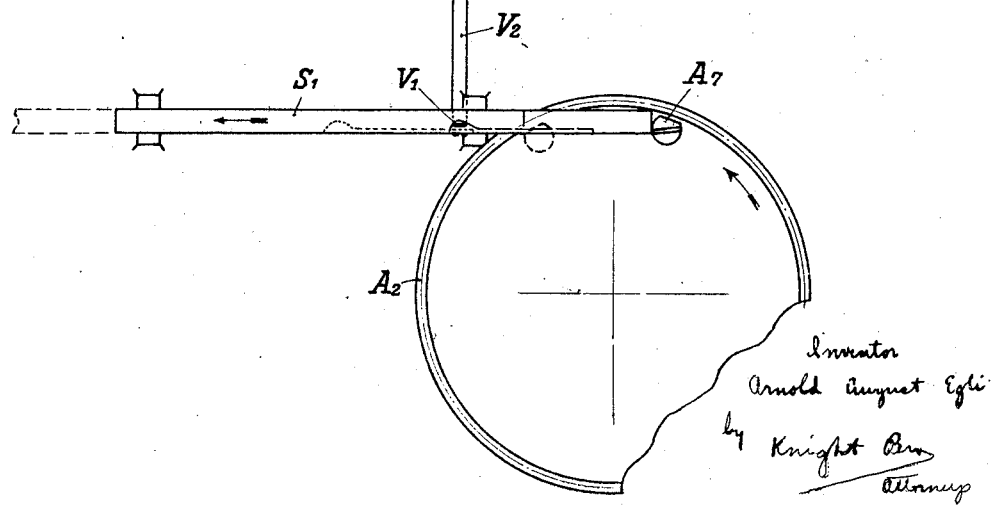
Fig. 7ᵃ
Inventor
Arnold August Egli
by Knight Bro
Attorney May 15, 1928. 1,669,932
A. A. EGLI
WRITING MACHINE
Filed March 29, 1923 13 Sheets-Sheet 8
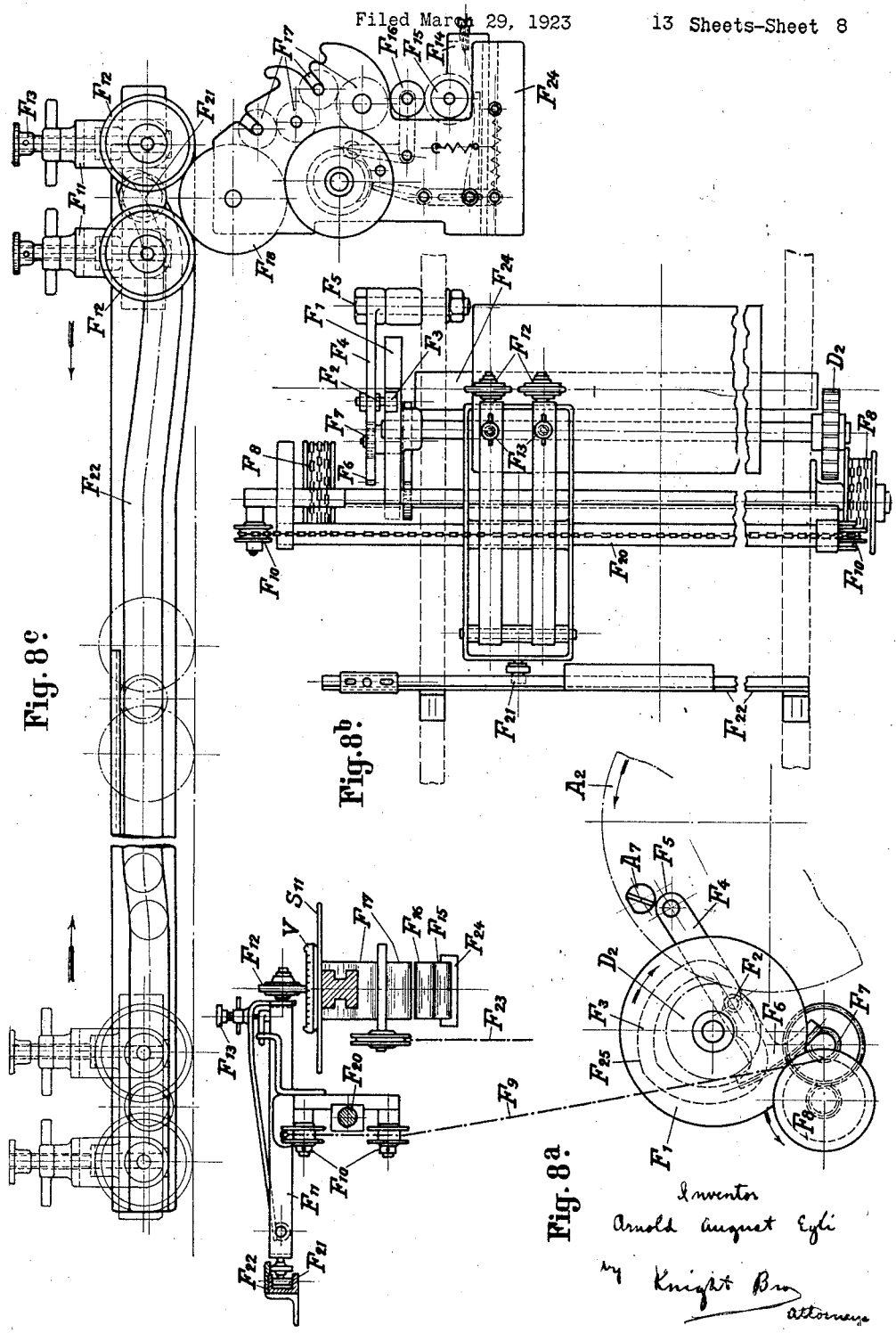

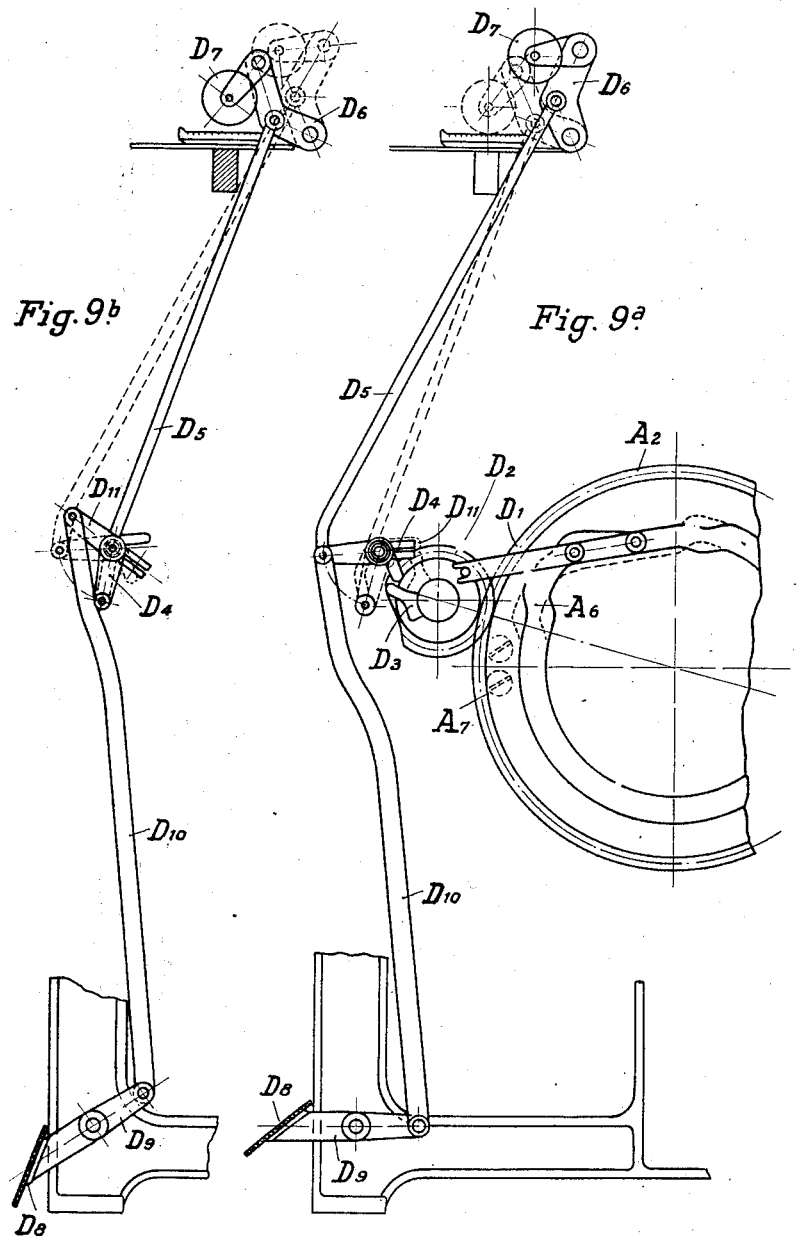

May 15, 1928.
A. A. EGLI
1,669,932
WRITING MACHINE
Filed March 29, 1923  13 Sheets-Sheet 10
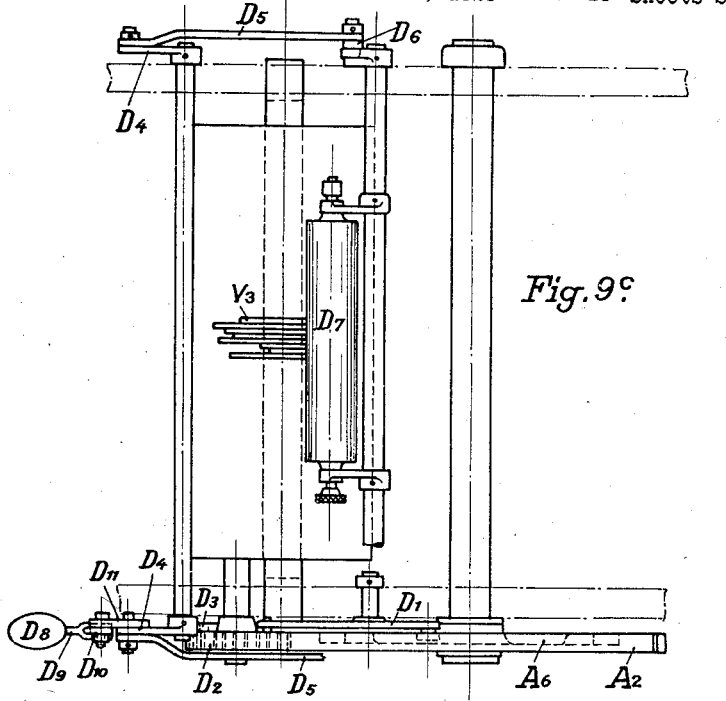
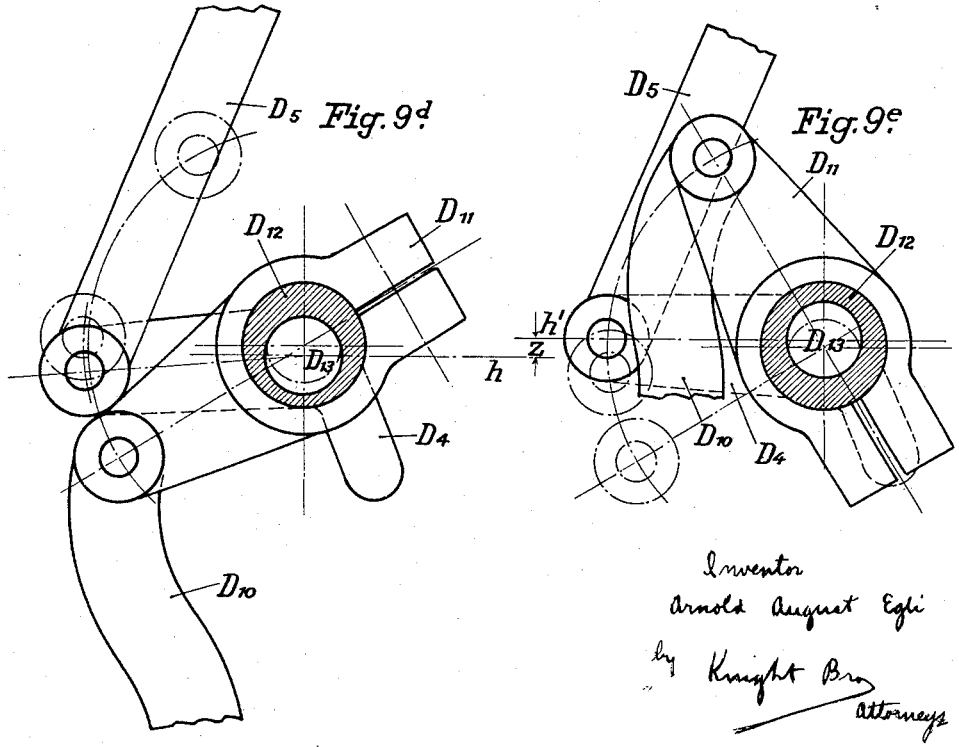
Inventor
Arnold August Egli
by Knight Bro
attorneys May 15, 1928.
A. A. EGLI
1,669,932
WRITING MACHINE
Filed March 29, 1923   13 Sheets-Sheet 11
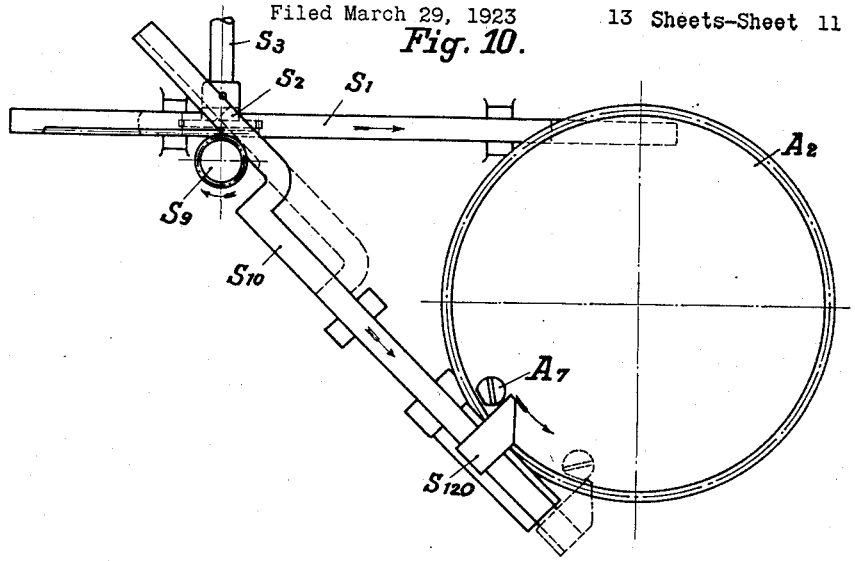
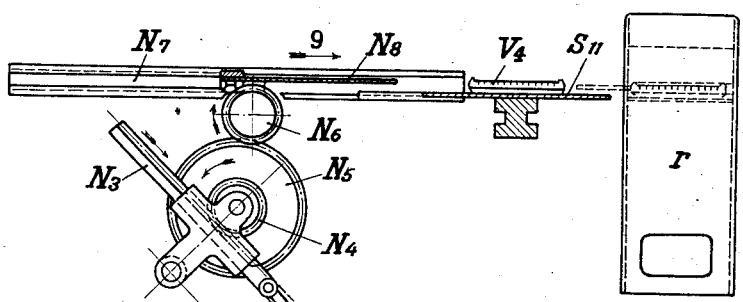
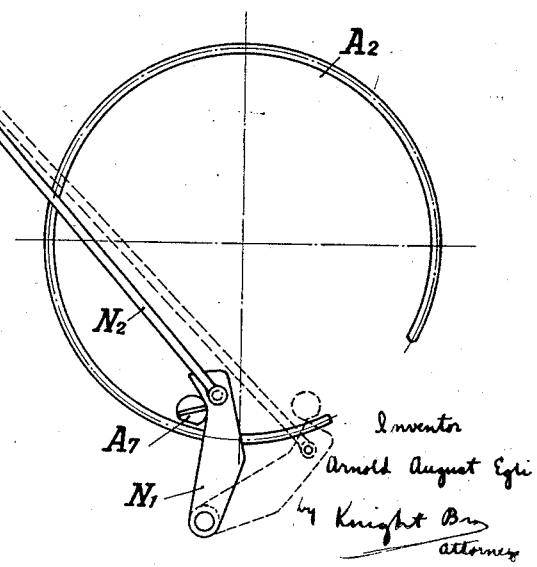

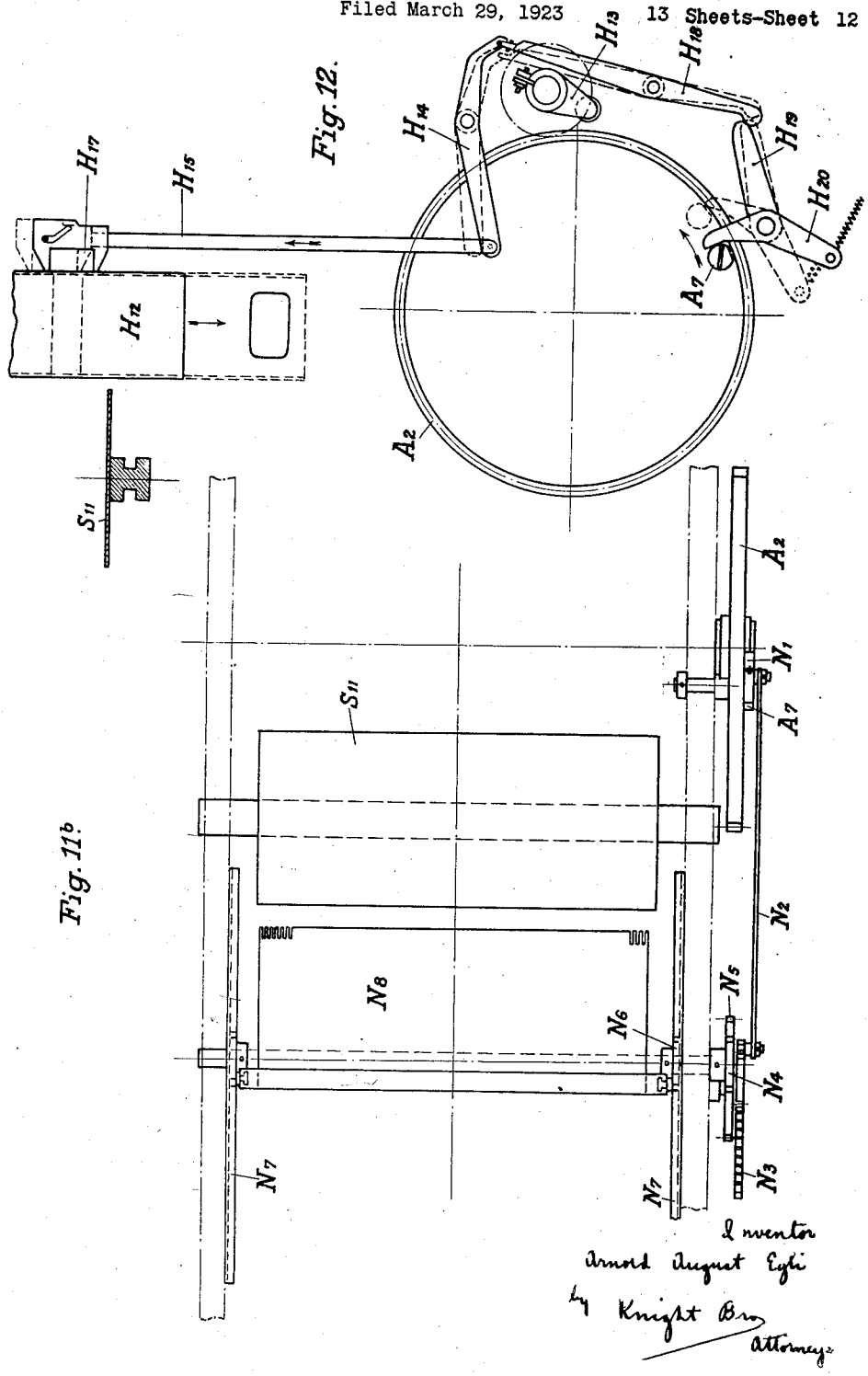

Patented May 15, 1928.

1,669,932

UNITED STATES PATENT OFFICE.

ARNOLD AUGUST EGLI, OF BERN, SWITZERLAND, ASSIGNOR, BY MESNE ASSIGNMENTS, TO CHOCOLAT TOBLER HOLDING CO., AKTIENGESELLSCHAFT, OF SCHAFFHAUSEN, SWITZERLAND.

WRITING MACHINE.

Application filed March 29, 1923, Serial No. 628,514, and in Germany December 11, 1922.

This invention relates to driving arrangements for line by line writing machines and one of its objects is to provide driving mechanisms which enable such machines to be operated without the operator having to exert more force when manipulating the keyboard than in a case of a good ordinary typewriter. Another object is to cause the machine to perform automatically all the operations that contribute the production of the finished print. To this end a main control wheel, from which the motions for the various operations are derived, is arranged to be coupled and uncoupled at proper times to a prime mover or any suitable source of power.

The invention is shown by way of example in the drawing in which

Figs. $1^a$–$1^d$ are four different diagrammatic views of the entire machine,

Fig. $2^a$ is a front elevation of a device for coupling the main control wheel to a continuously working drive, Fig. $2^b$ is a side view of the coupling arrangement of Fig. 2, Fig. 3 is a diagrammatic elevation of the main control wheel and the parts directly moved by the same, Fig. $4^a$ shows an arrangement for driving the device for lifting the typebar magazines, Fig. $4^b$ shows a driving mechanism that operates the magazine locking device, Fig. $4^c$ is a plan view of the arrangements shown in Figs. $4^a$ and $4^b$, Fig. $5^a$ is a side view of a driving device for operating the thrust members which push the typebars out of their magazines, Fig. $5^b$ is a side elevation of a device for alining the typebar thrust members, Fig. $5^c$ is a plan view of the devices shown in Figs. $5^a$ and $5^b$, Figs. $6^a$, $6^b$, $6^c$ are a side view, front view, and plan view respectively of arrangements for operating a spacing device which regulates the length of the lines to be printed, Fig. $7^a$ is a side view and Fig. $7^b$ a plan view of a typebar locking device whose parts have been brought into the printing position, Figs. $8^a$ and $8^b$ are a side view and a plan view respectively of an inking device for inking a set line of types, Fig. $8^c$ is a front view on an enlarged scale of the inking device, Figs. $9^a$, $9^b$, $9^c$ are two side elevations and a plan view respectively of a platen operating device, Figs. $9^d$ and $9^e$ are side views on an enlarged scale which illustrate the cooperation of the platen operating device and a device for preventing the platen from making an impression.

Fig. 10 is a side elevation of a device for opening the aforesaid spacing device.

Figs. $11^a$ and $11^b$ are a side elevation and a plan view of a device for returning the typebars into their magazines and Fig. 12 shows the means for unlocking the magazines, and Fig. 13 is a side elevation showing all the parts illustrated in Figs. 4–12 assembled in the machine.

Referring to the drawing, Figs. $1^a$–$1^d$ and $2^a$–$2^b$, X is a motor which, by means of a belt and a pulley $X^1$, drives a shaft which carries a worm $X^2$. The worm $X^2$ drives a worm-wheel $X^3$ which rotates on a shaft $X^4$. Keyed to the shaft $X^4$ is a pinion $A^1$ which is in mesh with a large wheel $A^2$ which is the main control wheel or cam wheel of the writing machine. Pivoted in brackets $X^6$, supported by the frame of the machine, is a hand-lever $X^5$ whose bottom end is linked to a coupling fork $X^8$, whose bottom end is pivoted in a bracket $X^7$. When the hand lever $X^5$ is swung in the direction of the arrow 1 (Fig. $2^a$) through an angle of about 30° the point $X^9$ is swung in the direction of the arrow 2 so as to compress a spring $X^{10}$. A spring hook $X^{11}$ then seizes a pin $X^{12}$ and thus locks the coupling fork $X^8$ in its operated position. When the coupling fork $X^8$ is swung to the right as described a clutch $X^{13}$, splined to the shaft $X^4$, is thrown into engagement with the worm wheel $X^3$ so as to couple the motor with the driving pinion $A^1$. This pinion $A^1$ then rotates the cam wheel $A^2$ which, as explained more fully hereinafter, is arranged so that, after it has executed one revolution, and a line of type has been set and an impression taken, the cam wheel is uncoupled again. This uncoupling operation is performed automatically by a projection $X^{14}$ arranged on the inner surface of the wheel $A^2$, the said projection being adapted to move a spindle $X^{15}$, Fig. $2^a$, towards the left against the pressure of the spring $X^{16}$ so as to swing the arm $X^{17}$ to the left and lift the hook $X^{11}$ out of engagement with the pin $X^{12}$. The spring $X^{10}$ then throws the coupling fork $X^8$ towards the left to disengage the clutch.

To enable the motion of the cam-wheel $A^2$ to be stopped at any moment, a special stopping lever or key $Y^1$ (Figs. $2^a$, $2^b$) is provided which, when moved, pulls a rod $Y^2$ upward. The rod $Y^2$ is linked to an arm $Y^4$ projecting from a hollow shaft $Y^3$ journalled on the shaft of the crank handle $X^5$. The hollow shaft $Y^3$ is connected by an arm $Y^5$ with a draw-rod $Y^6$ connected to the retaining hook or detent $X^{11}$ that locks the coupling fork $X^8$ in its operated position. When the emergency key or stopping key $Y^1$ is depressed the rod $Y^6$ with the hook or detent $X^{11}$ is raised so as to release the clutch $X^{13}$. By this means the main cam wheel can be stopped at any moment.

If the driving motor should become defective the main driving shaft may be rotated by a crank handle $A^3$ (Figs. $1^a$, $1^b$) which acts through bevel wheels and a shaft $A^4$ on a bevel wheel $A^5$ keyed to the driving shaft $X^4$ that carries the driving pinion $A^1$ which meshes with the main cam wheel $A^2$.

As shown in Fig. 3 the main cam wheel $A^2$ has a round non-circular cam groove $A^6$ in one of its flanks, and rollers or slide members, attached to the ends of levers $H^1$, $St^1$ and $D^1$, engage with the cam groove. The other ends of the said levers are linked to toothed wheels $H^2$, $St^2$ and $D^2$ and the teeth of these wheels are thrown into, or out of, engagement with the teeth of the cam wheel $A^2$ by the interaction between the cam groove $A^6$ and the said levers. The cam wheel also carries a projection $A^7$ which, during its rotation, moves the levers and members $St^9$, $S^1$, $S^{12}$, $N^1$ and $H^{20}$ (Figs. $5^b$, $6^a$, $7^a$, 10, $11^a$ and 12) and thus produces motions that will be described hereinafter.

Each of the magazines $H^{12}$ Figs. 4 $a$, $b$, $c$ contains besides type bars spacing members of adjustable breadth. The shifting of the desired type bar of each magazine and the desired type of the type bar by means of the keyboard is effected in the manner particularly described in the patent to Schäffer 1,466,491. In the present case the spacing member of adjustable breadth is to be selected and also to be brought into the printing position by a key of the keyboard and the other moving means in the same manner as a typebar. The spacing members are not inserted by hand as in the old patent. The adjustable breadth of the spacing members is adapted to form together with the type bars automatically an adjusted line.

When the registering operations for determining the types and spacing members that are to be brought into the printing position have been performed by means of the keyboard and the motor has thereupon been coupled to the cam wheel $A^2$, the latter commences rotating in the direction of the arrow 3 (Fig. $4^a$). During the rotation of this wheel the groove $A^6$ first acts through the lever $H^1$ on the toothed wheel $H^2$ (Fig. $4^a$). The wheel $H^2$ has no teeth at one part of its circumference, so that as long as it is in the position shown in Fig. $4^a$ no motion is imparted to it by the rotating cam wheel $A^2$. But when the lever $H^1$ swings the wheel $H^2$ round, its teeth are brought into mesh with the teeth of the cam wheel, and the wheel $H^2$ is then rotated in the direction of the arrow 4 (Fig. $4^a$). A crank $H^3$ attached to the bar $H^4$ is then rotated so as to move a lever pivoted at $H^6$ into the position indicated by broken lines. An arm $H^7$ linked to the upperd end of the lever $H^5$ then presses a bar $H^8$ in the direction of the arrow 5. The linkage $H^3$, $H^4$, $H^5$, $H^6$, $H^7$ is arranged at both sides of the machine so that the bar $H^8$ is pressed forward in a uniform manner. The bar $H^8$ co-operates with registers $H^9$ each of which has a number of catches or engaging members (not shown) which are set by the keys of the keyboard in accordance with the positions into which the typebar magazines $H^{12}$ are to be raised. When the bar $H^8$ is pushed forward as described, it co-operates with the set engaging members of the magazine registers $H^9$ and moves the latter from their normal positions (shown in solid lines) into a position (indicated by broken lines) that corresponds to their operated engaging members. When the registers $H^9$ are thus moved they transmit their motion through links $H^{10}$, $H^{11}$ to the typebar registers so as to raise them into the registered position as indicated in Fig. $4^a$ by broken lines. When the main control wheel or cam wheel $A^2$ has rotated a certain distance the parts moved by it, excepting the magazine, commence returning to their normal positions. The magazines are locked in their raised position by means of the toothed wheel $H^2$ that helped to raise them. To this end the wheel $H^2$ is provided with a cam $H^{13}$ which brushes against a lever $H^{14}$ and thus moves a rod $H^{15}$ in the direction of the arrow 6 (Fig. $4^b$). The bar $H^{15}$ moves a member provided with slanting slots $H^{16}$ and thus drives a locking member, whose pins engage with the slots $H^{16}$, towards the magazines $H^{12}$, so as to lock the same in their raised positions. When this locking operation is completed, the lever $H^{14}$ is held in its operated position (indicated in Fig. $4^b$ by broken lines) by a lever $H^{18}$. The unlocking of the described magazine locking mechanism is effected by the pin or projection $A^7$ after the cam wheel $A^2$ has rotated further, and after the completion of the printing operation and the restoration of the typebars into their magazines. The unlocking operation will be described more fully hereinafter with reference to Fig. 12.

On the further rotation of the cam wheel $A^2$ the cam groove $A^6$ operates a lever $St^1$ so as to cause a toothed wheel $St^2$, similar to the wheel $H^2$, to mesh with the teeth of the cam wheel $A^2$. The rotation now imparted to the wheel $St^2$ results in the rotation of a crank lever $St^3$ so that it goes into the position indicated in Fig. 5$^a$ by broken lines and imparts corresponding movements to a link $St^4$. A linkage, similar to $St^3$, $St^4$, is also arranged at the other side of the machine (see Fig. 5$^c$) and both linkages act on a bar $St^5$ which extends transversely through the machine and is moved forward in the direction of the arrow 7 by the said linkages. The bar $St^5$, when thus moved forward acts upon typebar and spacing members registers $St^{13}$ (Figs. 5$^a$ and 5$^c$) through engaging members (not shown) which are combined with the registers $St^{13}$ and operated by the keyboard in accordance with the amount of motion that is to be imparted to the registers. When the registers $St^{13}$ are moved forward they impart their motions to angular members $St^6$ which operate thrust members $St^7$ that push the typebars and spacing members out of the magazines $H^{12}$ onto the table $S^{11}$ of the writing or printing machine.

The shaft of the toothed wheel $St^2$ carries a cam $St^8$ (Fig. 5$^b$) which co-operates with a lever $St^9$ so as to pull a rod $St^{10}$ downward when the wheel $St^2$ is rotated a certain distance. The upper end of the rod $St^{10}$ carries a serrated plate $St^{11}$ whose teeth or ridges co-operate with similar ridges $St^{12}$ on the thrust members $St^6$ so as to bring the thrust members $St^6$ into alinement when the rod $St^{10}$ is moved downwards. The said serrations only remain in engagement with each other for a brief interval. They are disengaged by the spring (not shown). After a full turn of the wheel $St^2$ all parts indicated by the reference letters $St$ (Figs. 5$^a$ to 5$^c$) will have returned to their normal position, while the typebars $V^4$ (Fig. 7$^a$) remain on the table $S^{11}$ of the machine. On the further rotation of the cam wheel $A^2$ a projection $A^7$ (Figs. 6$^a$, 6$^b$, 6$^c$) comes into engagement with a rack $S^1$ and pushes the same forward. The teeth of this rack engage with a toothed wheel $S^2$ fixed to a vertical shaft $S^3$, whose top end carries a crank $S^4$ which acts on a rod $S^5$ linked to a rack $S^6$. The rack $S^6$ meshes with a toothed wheel $S^7$ which, in turn, meshes with a second rack $S^8$. When the rack $S^6$ is moved by the crank $S^4$ and the link $S^5$, the toothed wheel $S^7$ is turned and moves the rack $S^8$ in a direction opposite to the direction of motion of the rack $S^6$. These motions are used for operating a spacing device. The spacing device comprises sheet metal plates $S^{12}$ which are adapted to be moved towards each other and to press together the typebars that have been pushed into the space between them by the thrust members $St^7$. Elastic or spring spaces are inserted between the typebars so that, when the members $S^{12}$ of the spacing device are moved towards each other, the typebars are pushed together and the length of the line of types to be printed is adjusted.

When the rack $S^1$ is pushed forward it also rotates a toothed wheel $S^9$ journalled on a horizontal axis and adapted to impart motion to a bar $S^{10}$ so as to move it into the position indicated by broken lines. This motion of the bar $S^{10}$ is a preparatory action for the re-opening or restoration of the spacing device which will be explained more fully hereinafter.

The rack $S^1$ also has a recess $V^1$ (Fig. 7$^a$) in its lower edge by which bars $V^2$, arranged at both sides of the machine, Figs. 7$^a$, 7$^b$, are pulled downward. By this motion of the rods $V^2$ ridged bars $V^3$ are brought into engagement with notches in the top edges of the type-bars $V^4$, the typebars $V^4$ being thus finally alined and locked in their printing positions.

The typebars having been locked, the inking mechanism (Figs. 8$^a$, 8$^b$, 8$^c$) is now brought into operation, this operation being initiated by a cam disk $F^1$ mounted on the shaft of a toothed wheel $D^2$ which is devoid of teeth at a part of its circumference like the wheels $A^2$ and $St^2$. As soon as the wheel $D^2$ is brought into mesh with the main control wheel $A^2$, the cam disk $F^1$ is rotated and a roll $F^2$ engaging with a cam groove $F^3$ in the cam disk imparts motion to a lever $F^4$ pivoted at $F^5$. The free end of the lever $F^4$ carries a toothed segment $F^6$ which transmits motion through a wheel $F^7$, provided with two rings of teeth, to a roll or drum $F^8$. Wound upon the drum $F^8$ is a flexible member or chain $F^9$ which passes over guide rollers $F^{10}$ and is connected to a carriage $F^{11}$ guided by a slide bar $F^{20}$. The chain $F^9$ moves the carriage $F^{11}$ to and fro periodically over the set lines of types as will be explained more fully hereinafter. Mounted on the carriage are inking rollers $F^{12}$ which can be raised or lowered by adjusting screws $F^{13}$. The ink is taken from an ink applier consisting of an ink well $F^{24}$ from which the ink is taken by an ink dispenser $F^{14}$ which transfers the ink to a roller $F^{15}$. $F^{16}$ is an ink transferring member that transfers the ink to ink spreaders $F^{17}$ and finally to an inking cylinder $F^{18}$. The mechanism associated with the ink well is driven directly by the motor through a belt $F^{23}$ so that this mechanism also operates during the time that the main control wheel $A^2$ is stationary. The cylinders $F^{18}$ transfer the ink to the inking rollers $F^{12}$ that are guided by the carriage $F^{11}$ in the direction of the set line of type over the typebars. The carriage $F^{11}$ can rock transversely to its direction of motion on its guide bar $F^{20}$ and its rear end is guided by a roller $F^{21}$ in a grooved bar $F^{22}$.

The toothed wheel $D^2$ that imparts motion to the carriage $F^{11}$ and that is coupled by means of the forked bar $D^1$ (Fig. $9^a$) to the main control wheel $A^2$, acts, during its further rotation, on a device by means of which the platen, which carries the paper, is pressed against the set line of types. The platen rocker and its coordinated mechanisms are shown in Figs. $9^a$ to $9^e$. Mounted on the shaft of the wheel $D^2$ is a cam $D^3$ which, when rotated, acts on linkages $D^4$, $D^5$, $D^6$ arranged at both sides of the machine, and thus causes the platen $D^7$ to be moved from the normal position shown in Fig. $9^a$ into the printing position indicated in this figure by broken lines. After the impression the platen is restored by spring power to its normal position and is stepped round (by a line spacing device, not shown) a distance corresponding to the distance between two successive lines.

If for any reason the set line of type is not to be printed, the printing operation can be inhibited by means of a foot lever $D^8$. This is connected by a linkage $D^9$, $D^{10}$ through a lever $D^{11}$ (Figs. $9^d$ and $9^e$) clamped upon a sleeve $D^{12}$. The sleeve $D^{12}$ has an excentric bore in which a pin $D^{13}$ is fitted that is connected to a lever $D^4$. If the lever $D^{11}$ is turned through an angle of 90° as shown in Fig. $9^e$ by treading on the foot lever $D^8$, the center of rotation of the lever $D^4$ is raised from the level $h$ through a distance $z$ to the level $h^1$. The cam $D^3$ associated with the toothed wheel $D^2$ will now still act on the lever $D^4$ so as to swing down the platen. But as the center of rotation of the lever $D^4$ has been raised through the distance $z$ the platen will not swing down far enough to take an impression from the set line of types, but will stop at a distance corresponding to $z$ from the said line of types. After the toothed wheel $D^2$ has executed a full turn the inking carriage will return to its normal position. This is accomplished by means of the cam groove $F^3$ (Fig. $8^a$) which moves back the lever $F^4$ and the chain $F^9$ after the wheel $D^2$ and the disk $F^1$ have been turned into a position in which the guide roll $F^2$ travels past the outmost point $F^{25}$ of the groove $F^3$. On the further rotation of the main control wheel $A^2$ the projection $A^7$ strikes against a projection $S^{120}$ of the rod or bar $S^{10}$ which was previously pulled upward. The rotating projection $A^7$ returns the bar $S^{10}$ into the position indicated in Fig. 10 by broken lines. The toothed wheel $S^9$ is thus turned clockwise and the spacing device $S^1$—$S^9$ (Figs. $6^a$–$6^c$) is thus restored to its normal position and the locking bar $V^3$ (Fig. $7^a$) is moved back into its nonlocking position.

On the further rotation of the main control wheel $A^2$ the projection $A^7$ (Fig. $11^a$) strikes against a lever $N^1$ which, by means of a link $N^2$, pulls a rack $N^3$ downward and, through gear wheels $N^4$, $N^5$, $N^6$ moves the racks $N^7$ (Figs. $11^a$ and $11^b$) towards the right which are arranged at both sides of the machine. By this means a "following up plate" and preferably consisting of two parts to enable its length to be adjusted is moved in the direction of the arrow 9 (Fig. $11^a$) so that its fingers push the type-bars $V^4$, and if necessary the spacing members between the words, back into the magazine compartments. As soon as the projection $A^7$ leaves the lever $N^1$, the parts $N^2$ to $N^8$ return to their normal positions. The following up plate $N^8$ is preferably serrated or provided with fingers (see Fig. $11^b$) at its front edge by which the typebars are pushed entirely into the magazines.

Shortly before the main control wheel $A^2$ has executed a full turn, the projection $A^7$ encounters a three-armed lever $H^{20}$ (see Fig. 12), whose arm $H^{19}$ moves the lever $H^{18}$ into the position indicated by broken lines. By this means the locking of the magazines described with reference to Fig. $4^b$ is undone, so that the locking member $H^{17}$ allows the magazines to drop down into their normal positions.

The main control wheel $A^2$, having now executed a full turn, is uncoupled from the drive by means of the projection $X^{14}$ and the longitudinally displaceable bar $X^{15}$. When a new line of type is now registered with the aid of the keyboard the cam wheel $A^2$ is again coupled to the drive and all the motions hereinbefore described are repeated.

I claim—

1. In a writing machine, movable typebar magazines, in the magazines movable typebars and spacing members of adjustable breadth adapted to determine the spaces between any two words, magazine registers for determining the position into which the magazines are to be moved, second registers for determining the type on any typebar or a spacing member, that is to be moved into the printing position, moving means in combination with a said second register for moving the said typebars and spacing members out of the magazines immediately into the printing position and a motor drive for moving the magazines into their registered positions and for thereupon moving the typebars and the spacing members into their registered positions.

2. In a writing machine, movable typebar magazines, in the magazines movable typebars and spacing members of adjustable breadth adapted to determine the spaces between any two words, magazine registers for determining the position into which the magazines are to be moved, second registers for determining the type on any typebar or a spacing member, that is to be moved into the printing position, pushing means in combination with a said second register for pushing the said typebars and spacing members out of the magazines immediately into the printing position and a motor drive for moving the magazines into their registered positions and for thereupon moving the typebars and the spacing members into their registered positions.

3. In a writing machine, movable typebar magazines, in the magazines movable typebars and spacing members of adjustable breadth adapted to determine the spaces between any two words, magazine registers for determining the positions into which the magazines are to be moved, registers for determining the type on any typebar or a spacing member that is to be moved into the printing position and a motor drive for moving the magazines into their registered positions and for thereupon moving the typebars and the spacing members into their registered positions.

4. In a writing machine, movable typebar magazines, movable typebars in the magazines, keys, registers operable by the said keys for determining the magazines to be moved and the types on the typebars that are to be moved into the printing positions, means for setting the magazines into their registered positions, and locking means adapted to engage the magazines on their back side and to lock the magazines themselves in their set positions while the setting means return to their normal positions.

5. In a writing machine, movable typebar magazines, movable typebars in the magazines, means for moving the typebars out of the magazines into the printing position, and separate aligning means for exactly aligning the typebar movers after their first moving action.

6. In a writing machine, movable typebar magazines, movable typebars and spacing members of adjustable breadth in the magazines, magazine registers for determining the positions into which the magazines are to be moved, typebar and spacing member that is to be moved into the printing position, and a determining device for pressing together the moved typebars and spacing members and thereby determining the length of a line of type in the printing position and for returning the typebars and the spacing members to their positions before the magazines.

7. In a writing machine, typebars and spacing members adapted to be moved into a printing position, a determining device for determining the length of a line of type and for restoring the typebars and spacing members to their normal distances apart from each other, two operating parts for operating the determining device, a fixed rotatable toothed wheel, a rack connected to each of the said two parts and in mesh with the said wheel and means for moving one said part.

8. In a writing machine, typebars and spacing members adapted to be moved into a printing position, a determining device for determining the length of a line of type and for restoring the typebars and spacing members to their normal distances apart from each other, two operating parts for operating the determining device, a fixed rotatable toothed wheel, a rack connected to each of the said two parts and in mesh with the said wheel and motor driven means for moving one said part.

9. In a writing machine, movable typebars, movable typebar magazines, key-operated registers for determining the positions into which the magazines and typebars are to be moved, means for moving the typebars out of the magazines and back, locking means for locking the magazines in their determined positions until the typebars have been returned into them, typebar shifters controlled by the said registers, primary aligning means for aligning the typebar shifters, secondary aligning means for aligning and locking a line of type formed by the typebars, a spacing device for determining the length of a line of type and for guiding the typebars back to the magazines, an inking device for inking a line of type, means for restoring the said locking means, means for restoring the registers and the typebar and magazine moving means to their normal positions after the operation of the said locking means and a common motor drive for operating all said movable parts of the machine.

10. In a writing machine, typebar magazines, typebars in the said magazines, means for moving the said typebars out of the magazines into a printing position so as to form a line of type, notches in the upper side of the said typebars, and a device for aligning the said line of type being adapted to be moved so as to engage the said typebars when they are in their printing position, the said device consisting of two bars, each provided with a rib and being arranged at a certain distance apart from each other so as to permit of the platen entering between them.

In testimony whereof I have affixed my signature.

ARNOLD AUGUST EGLI.